US008917820B2

(12) United States Patent
Michaelis

(10) Patent No.: US 8,917,820 B2
(45) Date of Patent: Dec. 23, 2014

(54) SYSTEMS AND METHODS TO SUPPORT USING ANALOG TTY DEVICES WITH VOICE-ONLY PC SOFT CLIENTS

(71) Applicant: Avaya Inc., Basking Ridge, NJ (US)

(72) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/777,531

(22) Filed: Feb. 26, 2013

(65) Prior Publication Data

US 2014/0241512 A1 Aug. 28, 2014

(51) Int. Cl.
*H04M 11/00* (2006.01)
*H04M 3/42* (2006.01)

(52) U.S. Cl.
CPC .................. *H04M 3/42391* (2013.01)
USPC ............................................................ 379/52

(58) Field of Classification Search
CPC .......... H04M 3/42391; H04M 1/2475; H04M 1/72591
USPC ............................................................ 379/52
See application file for complete search history.

(56) References Cited

U.S. PATENT DOCUMENTS 5,604,786 A * 2/1997 Engelke et al. ................. 379/52
2011/0075821 A1 3/2011 Michaelis

* cited by examiner

*Primary Examiner* — Stella Woo
(74) *Attorney, Agent, or Firm* — Sheridan Ross P.C.

(57) ABSTRACT

Methods and systems for allowing analog TTY devices to be operated in conjunction with voice-only soft client applications are provided. Supported communication styles include a text-only TTY mode, a mode in which the user of the soft client receives text and responds by voice, a mode in which the user receives voice and responds with text, and a voice-only mode. Mode selection may be manual or automatic. Communication between the TTY device and far-end user may be via a direct connection between the TTY and the associated PBX, or via a connection between the TTY and the PC that is hosting the soft phone application.

20 Claims, 4 Drawing Sheets

SYSTEMS AND METHODS TO SUPPORT USING ANALOG TTY DEVICES WITH VOICE-ONLY PC SOFT CLIENTS

FIELD

Systems and methods for supporting teletype (TTY) communications are disclosed. More particularly, support for using an analog TTY device with a soft client executed by a computer is disclosed.

BACKGROUND

Personal computer (PC) based thick clients or soft phones, such as Avaya one-X Communicator and Avaya Aura Agent Desktop, or browser based thin telecommunications clients, such as WebRTC applications, can operate in various modes. For example, in what is sometimes referred to as a "Road Warrior" mode, the media stream associated with a communication goes to and from the PC, with audible inputs and outputs typically supported by the PC's soundcard. As another example, in what is sometimes referred to as a "Telecommuter" mode, the media stream associated with a communication goes to and from a physical telephone that is under the control of the PC.

A problem that arises in connection with disability access and Section 508 compliance is that most PC clients have no inherent support for TTY communication. (A TTY, also known as a TDD, is an analog text terminal used by people who are deaf, hard-of-hearing, or speech-impaired for communication via a telephone network.) A soft client that does not provide inherent support for TTY communication must be operated in a Telecommuter mode, with the soft client controlling a physical TTY device, in order for a user of the soft client to communicate with another party using TTY communication. The problem is that many contact centers or other operations that use soft clients typically operate in Road Warrior mode, with no ability to change to Telecommuter mode mid-call. Accordingly, a contact center agent who receives a TTY call while in the Road Warrior mode will be unable to respond to that call without losing access to the job-specific options that a specialized soft client presents (e.g., an ability to view a list of the previous transactions associated with the caller's "caller ID" information).

In a typical scenario in which a contact center agent is operating in Road Warrior mode, the agent's first indication that the caller is using a TTY is that the agent will hear TTY "Baudot tones" in his or her headset. The agent must then quickly transfer the call away from the soft client to his or her desktop TTY device, and then answer the call with the TTY. Because the agent's PC is now no longer in the call path, all of the soft client functionality is lost. This can result in severely diminished capabilities because TTY devices are analog telecommunication devices with functionality limited to what is available on basic plain old telephone system (POTS) phones.

Another factor that must also be taken into account with a soft client solution is that only about 50% of TTY users are deaf. Most of the remaining 50% are hard-of-hearing. The distinction is important because the vast majority of hard-of-hearing individuals have no trouble speaking. Quite simply, their problem is that they cannot hear adequately on a telephone. These individuals often prefer to receive via TTY and then reply by voice, a mixed-mode style of communication referred to as Voice Carry Over or VCO. The person who is communicating with a VCO user must be able to transmit via TTY and then receive a voiced response, a mixed-mode style of communication referred to as Hearing Carry Over or HCO.

Although the US Code of Federal Regulations, 36 CFR Part 1194.23(a), requires support for mixed-mode voice-and-TTY communication, neither the Road Warrior nor the Telecommuter modes of operation satisfies the regulation.

Although it may seem that the obvious solution is to embed a "soft TTY" function within the soft client, thereby allowing TTY support while in Road Warrior mode, this solution is impractical because of the large variety of incompatible TTY protocols in use around the world. For example, TTY devices in the United States follow the 45.45 baud Baudot protocol, TTY devices in the United Kingdom follow the 50 baud Baudot protocol, TTY devices in Germany follow the EDT standard, TTY devices in France follow the Minitel standard, TTY devices in Sweden follow the V.21 standard, and so on.

A solution is required that allows an analog TTY device to be used in conjunction with a soft client, while continuing to use the PC's audio capabilities for voice communication.

SUMMARY

Systems and methods that provide support for TTY communications in connection with TTY devices operated in connection with computer implemented endpoints, such as but not limited to endpoints running soft clients, such as soft phones or other thick clients, or thin clients such as WebRTC (Real Time Communication) enabled browsers, are disclosed. More particularly, a communication application, such as a soft phone, WebRTC browser, or other application supporting voice communications can be executed by a computer. The computer can receive audible inputs from and provide audible output to a user through an attached microphone and speaker, or through a headset. In addition, the computer is connected to a TTY device. The computer can also be connected to a physical telephone. In accordance with embodiments of the present disclosure, different communication modes supported by the soft client and the devices associated with the computer can be selected through operation of the soft client, an associated monitor/branching application, and/or manual user input.

Methods in accordance with embodiments of the present disclosure allow a computer executing a soft client or other application operating in a "Road Warrior" mode, in which a media stream comprising audible signals is provided to and received from a user of a communication endpoint through the computer running the soft client or other application, to switch mid-call to a "Telecommuter" mode, in which the media stream originates and terminates in an associated device. (Note that, in Telecommuter mode, all non-media and call control functions presented by the user interface of the application remain available to the user. The only difference is that the PC is no longer being used as a media endpoint.) In this case, the associated device is a TTY. In accordance with at least some embodiments, the transmit and receive media streams are handled differently. Specifically, when the communication endpoint is operated in Voice Carry Over or VCO mode, the received signal is directed to the user's TTY device (as it would be in Telecommuter mode) to provide a text output to the user, with the user's voice responses transmitted to the other party via the PC audio apparatus (as it would be in Road Warrior mode). Similarly, when the communication endpoint is operated in Hearing Carry Over or HCO mode, the received voice signal is directed to the PC audio apparatus, with all transmission by the user originating from the TTY device. In accordance with at least some embodiments, the TTY communication is transmitted using a connection to a communication server that bypasses the computer of the communication endpoint.

In an exemplary configuration, the communication endpoint user's microphone would be muted automatically when the user is entering text to the TTY device. The purpose of this muting is to ensure that the TTY transmissions are not corrupted or distorted by sounds that might be picked up by the microphone. Similarly, the communication endpoint user's headset or speakers would be muted automatically when TTY communications are being received and text is being output to the user by the TTY device. The purpose of this muting is to avoid forcing the user to hear the TTY tones. The switch from a Road Warrior mode to a Telecommuter mode, and/or to one of the hybrid modes, can be made automatically or in response to user input. Factors that could identify the need for a mode change include:

(a) Receiving a call at the first communication endpoint, with a "Caller ID" number or name that is known to be associated with a TTY, HCO, or VCO requirement;
(b) Initiating a call from the first communication endpoint, to a number or name that is known to be associated with a TTY, HCO, or VCO requirement;
(c) Receiving a call at the first communication endpoint via an inbound phone number identified as being for TTY, VCO, HCO users;
(d) Receiving a call at the first communication endpoint that had been routed to the user via a TTY hunt group;
(e) Receiving a call at the first communication endpoint in which the calling party had previously self-identified as requiring TTY, VCO, HCO support;
(f) Detection of TTY communications by an enterprise public switched telephone network (PSTN) Gateway;
(g) Detection of TTY communications by the soft client.

In addition, the ability to switch modes manually is supported. For example, if the user of the communication endpoint operating in Road Warrior mode hears TTY communications in his or her headset, the user can switch manually to one of the TTY modes. The mode switching operations can be made mid-call.

Architecturally, various configurations are supported. In one case, there is a direct communication pathway between the TTY device and the associated PBX, illustratively an Avaya Communication Manager or Nortel Communication Server 1000. In this configuration, control of the media streams—i.e., control of whether the PC audio mechanism or the TTY should be the media endpoint—is handled by the PBX. In the other configuration, the TTY is connected to the PC rather than to the PBX. Methods that allow direct TTY-PC communication include USB, Bluetooth, and connection via the PC's headphone jack. In this configuration, all communication to and from the PBX is directed to the PC, with control of the media streams handled by the PC soft client.

In addition, a communication endpoint can be configured in a variety of ways. For example, the communication endpoint can include a computer that executes an application. In an exemplary embodiment, the application is a soft client that can provide Road Warrior and Telecommuter modes, and support for TTY and hybrid TTY modes. Moreover, the soft client can comprise a soft phone and/or can include or be associated with a monitor application branching application. In another exemplary embodiment, the endpoint can include a computer that executes a browser or other application that enables the computer to provide Road Warrior and/or Telecommuter modes, and support for TTY and hybrid TTY modes. According to such embodiments, the application can include a browser with Real Time Communication (RTC) capabilities that is in communication with a web server. Such capabilities can be provided by incorporating WebRTC components in the browser.

Additional features and advantages of embodiments of the present invention will become more readily apparent from the following description, particularly when taken together with the accompanying drawings.

DETAILED DESCRIPTION

Figure 1:
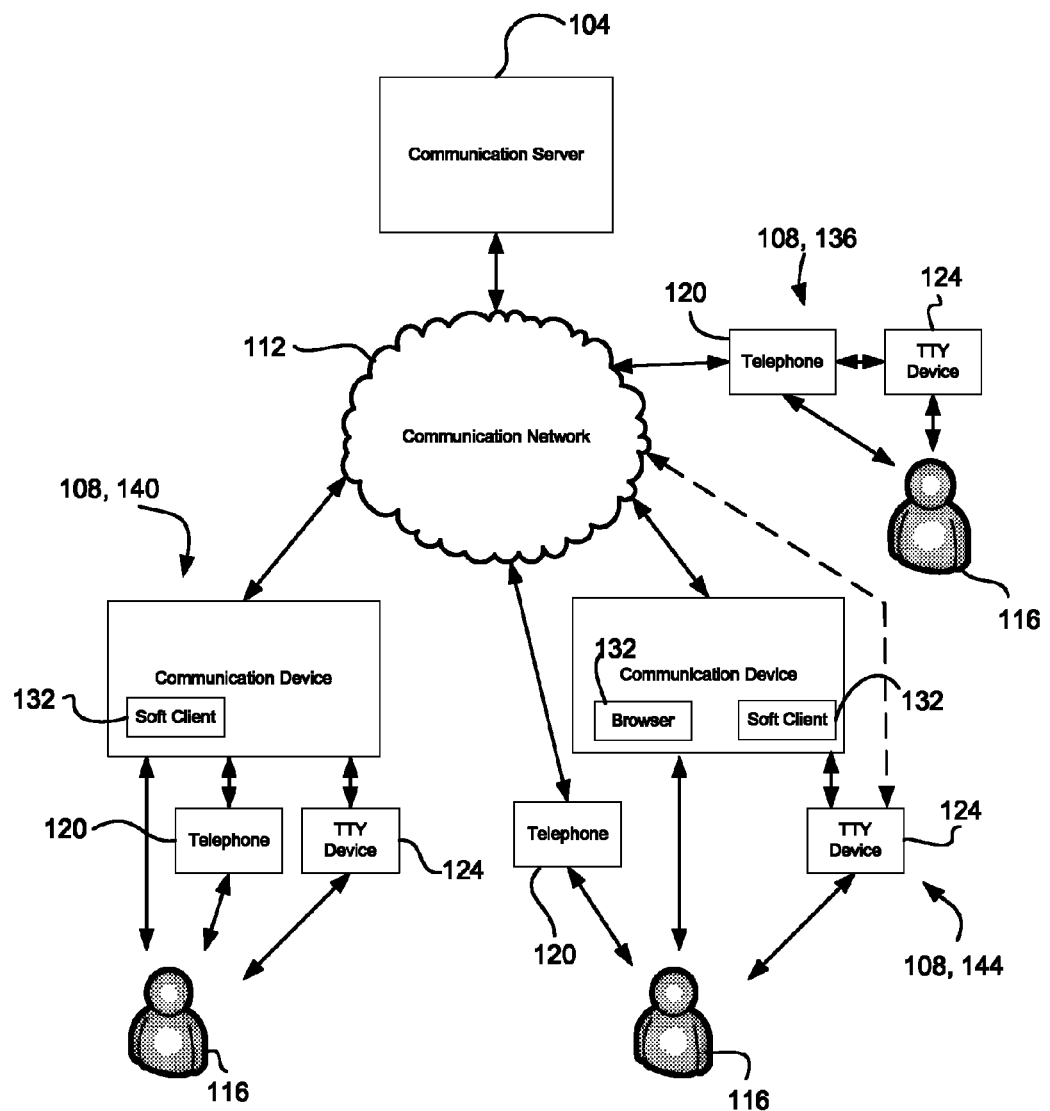
FIG. 1 is a block diagram depicting components of a system in accordance with embodiments of the present disclosure.

FIG. 1 is a block diagram depicting components of a communication system 100 in accordance with embodiments of the present invention. As shown, the communication system 100 can include a communication server 104. The communication system 100 also includes a plurality of communication endpoints or devices 108. The communication endpoints 108 are in communication with one another (and with the communication server 104, if provided) via one or more communication networks 112. In addition, each communication endpoint 108 can be associated with a user 116.

In an exemplary embodiment, the communication system 100 can include one or more communication endpoints 108 that are part of an enterprise system. For instance, portions of the communication system 100 can comprise a call center. In addition, the communication system 100 can include at least portions that comprise the public switched telephone network (PSTN).

The communication server 104 can provide support for various functions. For example, the communication server 104 can comprise an automatic call (or contact) distribution (ACD) system that performs call routing functions to connected communication endpoints 108 comprising agent workstations or endpoints, each associated with an agent user 116, connected as part of an enterprise system or network. When implemented as an ACD server, the communication server 104 generally functions to connect communication endpoints 108 comprising agent workstations to communication devices or endpoints 108 of customers or other users 116 through the communication network 112, to allow agent users 116 to service customer contacts. In accordance with embodiments of the present disclosure, the contacts comprise telephony communications. For example, contacts can be in the form of voice communications. Alternatively or in addition, the contact can at least partially be in the form of a TTY communication. As can be appreciated by one of skill in the art after consideration of the present disclosure, the communication server 104 can maintain one or more queues for organizing and maintaining or holding contacts waiting for handling by a contact center agent user 116. For example, a single queue or plurality of queues can be provided to sort contacts according to various parameters. Agent users 116 are assigned to provide services to contacts that have been placed within one or more of the queues based on availability and/or weighting factors. As another example, the communication server 104 can comprise a private branch exchange (PBX). As yet another example, the communication server 104 can comprise an automated resource, such as an interactive voice response (IVR) system or server. Although shown as including one server 104, a communication system 100 can include multiple servers 104 of the same or different types.

A communication endpoint 108 generally provides support for voice communications. In accordance with embodiments of the present disclosure, a communication endpoint 108 will provide support for TTY communications. Accordingly, a communication endpoint 108, and in particular an analog communication endpoint 136, can comprise a telephone 120 (e.g. an analog telephone or hardware voice over Internet protocol (VoIP) telephone) and an associated TTY device 124. As can be appreciated by one of skill in the art after consideration of the present disclosure, a telephone 120 is at least capable of supporting basic voice telephony functions in connection with a circuit-switched or packet data network 112. As can also be appreciated by one of skill in the art after consideration of the present disclosure, a TTY device 124 is an analog device capable of receiving and/or transmitting text using signals in the form of tones according to one or more TTY protocols. In addition to supporting voice and TTY communications, the communication endpoints 108 comprising workstations can include a user output in the form of a display and a speaker, either freestanding or as part of a headset, and a user input in the form of a keypad, keyboard, touch screen input, pointing devices, video cameras, a microphone, or the like. At least one communication endpoint 108 in a communication system 100 in accordance with embodiments of the present disclosure is a communication endpoint 108 comprising a first type of soft client (e.g., soft phone) enabled communication endpoint 140 that includes a computer 128 that provides telephony functions through the execution of a voice telephony soft client application 132. The first type of soft client enabled communication endpoint 140 comprising a computer 128 also includes a TTY device 124 attached the computer 128, and audible output device, and an audible input device. The first type of soft client enabled communication endpoint 140 comprising a computer 128 can also include a telephone 120 attached to or operated in association with the computer 128. In addition, the communication system 100 can include a communication endpoint 108 comprising a second type of soft client enabled communication endpoint 144, which is similar to the first type of soft client enabled communication endpoint 140, but is associated with a telephone 120 that is provided with a telephony signal by the communications server 104, that is not processed by and/or passed through the computer 128 included in the second type of soft client enabled communication endpoint 144. Moreover, this second type of soft client enabled communication endpoint 144 can operate in connection with a communication application that includes a soft client application 132 comprising a soft phone or a WebRTC (Real Time Communication) enabled browser application 134.

The communication network 112 can include a private intranet, the Internet, a local area network (LAN), wide area network (WAN), public switched telephone network (PSTN), wireless networks, cellular telephony networks, satellite telephony networks, virtual or cloud networks, remote or off-premise networks. In addition, the communication network 112 can include a plurality of networks in any combination.

Figure 2A:
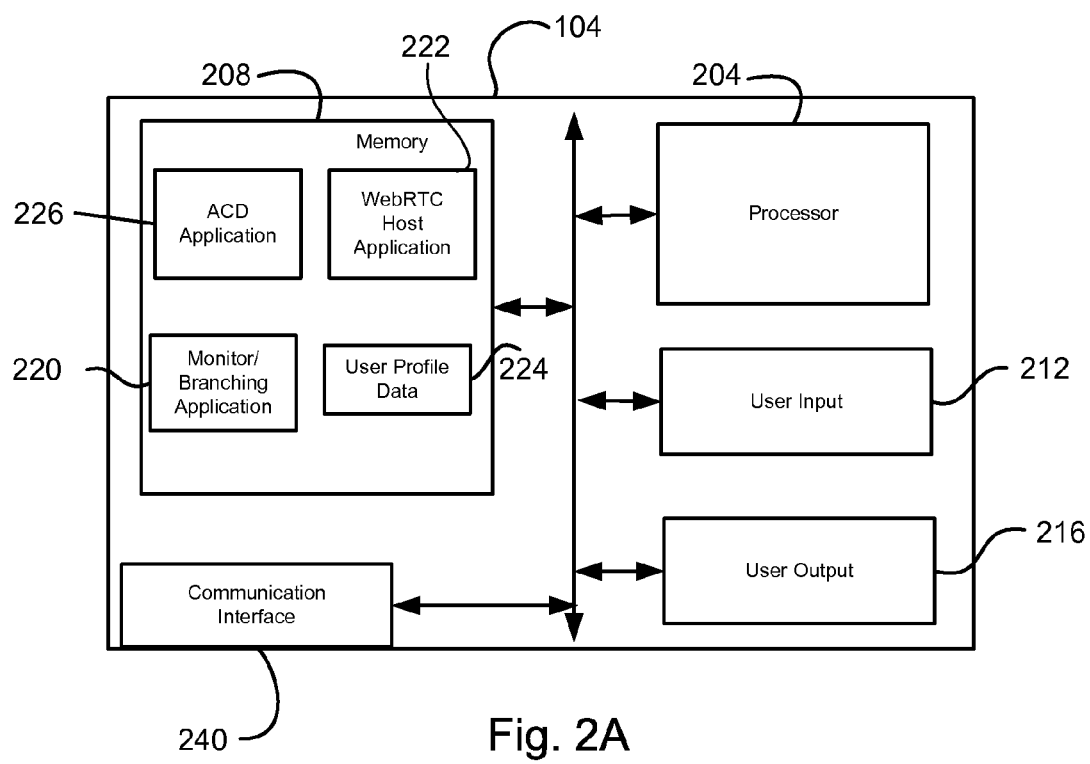
FIG. 2A is a block diagram of a server executing a monitor/branching application in accordance with embodiments of the present disclosure.
Figure 2B:
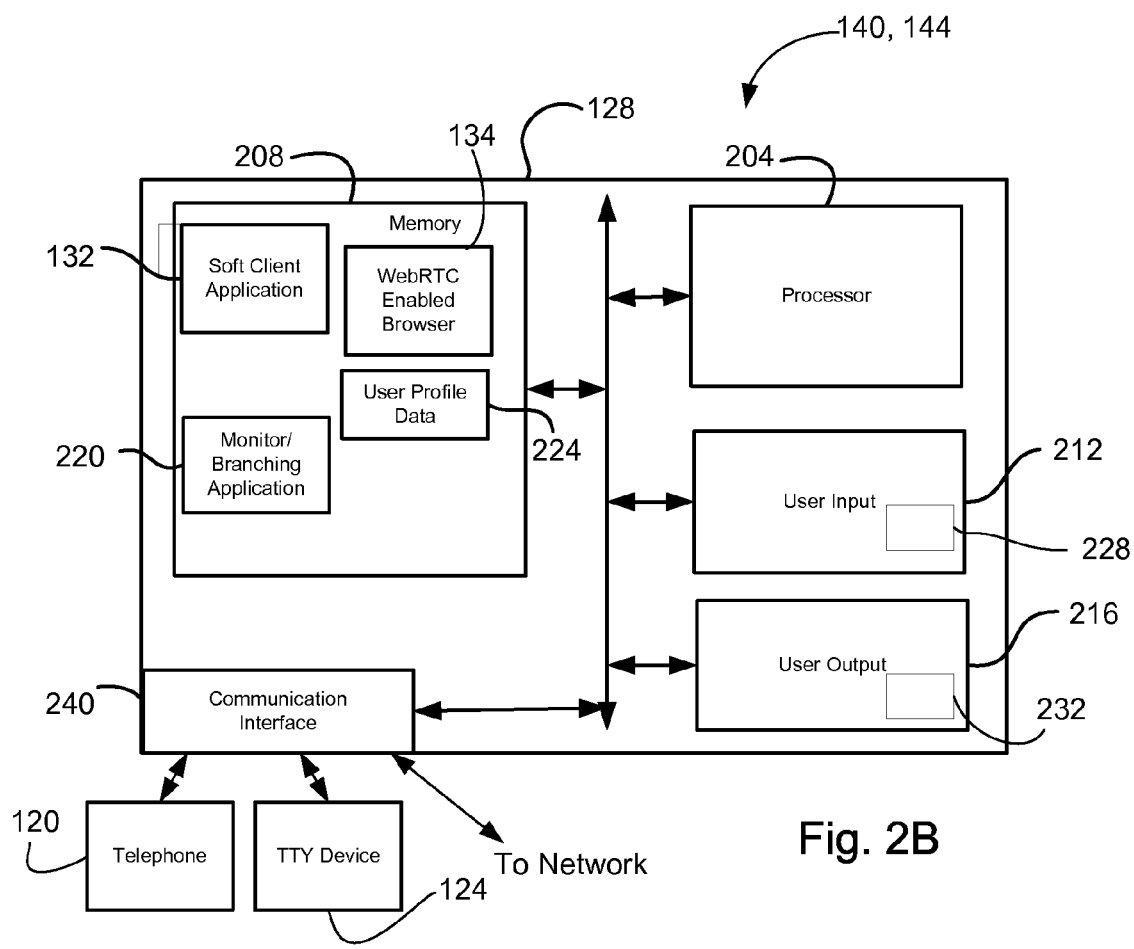
FIG. 2B is a block diagram of a computer executing a soft client application accordance with embodiments of the present disclosure.

FIG. 2A is a block diagram depicting components of a server 104 in accordance with embodiments of the present disclosure. The server 104 can include a general purpose computer or server, and can comprise any type of server device, including but not limited to a communication server. FIG. 2B is a block diagram depicting components of a communication endpoint 108 comprising a soft client enabled communication device 140 or 144 that includes a computer 128 in accordance with embodiments of the present disclosure. The computer 128 can comprise a general purpose computer, such as a desktop or laptop personal computer (PC). As a further example, the computer 128 can comprise a thin client device operating in connection with a server, such as a communication server 104 that provides hosted virtual machine (VM) services. As yet another example, the computer 128 can comprise any computing device capable of providing a voice telephony facility or soft phone function by executing, either locally or remotely through a virtual machine, a soft client application 132 and/or a WebRTC enabled browser 134 as described herein.

As both the server 104 and the two types of soft client enabled communication devices 140 or 144 generally incorporate computers, the following discussion applies to both FIGS. 2A and 2B, unless noted otherwise. The server 104 or computer 128 includes a processor 204 capable of executing program instructions. The processor 204 can include any general purpose programmable processor or controller for executing application programming. Alternatively, the processor 204 may comprise a specially configured application specific integrated circuit (ASIC). The processor 204 generally functions to run programming code implementing various functions performed by the server 104 or computer 128. For example, the processor 204 can implement functions including but not limited to performing monitor/branching functions through the execution of a monitor/branching application and/or supporting voice telephony and TTY communications as described herein.

The server 104 and computer 128 additionally include memory 208. The memory 208 can be used in connection with the execution of programming by the processor 204, and for the temporary or long term storage of data and/or program instructions. In accordance with embodiments of the present disclosure, the soft client application 132 associated with a soft client enabled communication device 140 or 144 may be stored on and executed in connection with the memory 208 of the associated computer 128. Alternatively or in addition, the memory of a soft client enabled communication device 144 can store a WebRTC enabled browser 134, for example where a soft phone function is provided by the WebRTC enabled browser 134 in combination with a server 104 hosting WebRTC services. As a further example, the memory 208 of the server 104 and or a soft client enabled communication device 140 or 144 can store a monitor/branching application or function 220. As yet another alternative, the functions of a monitor/branching application 220 can be performed entirely or in part by the soft client application 132. A WebRTC host application 222 can be provided by a server 104 in communication with systems 100 using communication endpoints 144 with WebRTC enabled browsers 134. As another example, user profile data 224 can be stored in the memory 208. A server 104 implementing an ACD function can also include an ACD application 226. The memory 208 can include solid state memory that is resident, removable and/or remote in nature, such as DRAM and SDRAM. Moreover, the memory 208 can include a plurality of discrete components of different types and/or a plurality of logical partitions. In accordance with still other embodiments, the memory 208 comprises a non-transitory computer readable storage medium. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read.

In addition, and in particular in connection with a soft client enabled communication endpoint 140 or 144, user input devices 212 and user output devices 216 may be provided. As examples, a user input device 212 can include a microphone 228, while a user output device 216 can include a speaker 232. A user input device 212 can also be integrated with a user output device 216, for example in the form of a headset that provides both a microphone 228 and a speaker 232. Whether provided separately or as part of an integrated peripheral device, a microphone 228 and a speaker 232 can be operated in connection with an interface or facility of the computer 128 for receiving audible input from and providing audible output to a user 116, for example in the form of a sound card integrated with or attached to the computer 128. Other examples of user input devices 212 include a keyboard, a numeric keypad, a touch screen, touch pad, mouse, video camera, scanner, and pointing device combined with a screen or other position encoder. Other examples of user output devices 216 include a display, a touch screen display, and a printer.

The server 104 and soft client enabled communication endpoint 140 or 144 also generally include a communication interface 240 that interconnects the communication server 116 to the communication network 112 to support the transmission of voice and/or TTY communications. The communication interface 240, or alternatively one or more additional communication interfaces 240, also support connections between the computer 128 and a TTY device 124, and/or a telephone 120. Accordingly, examples of a communication interface 240 include a wired or wireless Ethernet network interface, a plain old telephone system (POTS) interface, a universal serial bus (USB) interface, a Bluetooth interface, or the like.

As shown in FIG. 2B, a soft client enabled communication endpoint 140 or 144 can be associated with a hardware telephone 120 and/or a TTY device 124. More particularly, the first type of soft client enabled communication endpoint 140 includes both a telephone 120 and a TTY device 124. The telephone 120 and TTY device 124 can be connected to the computer 128 through the communication interface 240. For example, the telephone 120 and TTY device 124 can be connected to the computer 128 via separate USB ports provided as part of the communication interface 240. The second type of soft client enabled communication endpoint 144 includes a telephone 120 that is available to the user 116 of that communication endpoint 144, for example by being located in the proximity of the computer 128, but that is not connected to the communication interface 240. Instead, the telephone 120 provided as part of the second type of soft client enabled communication endpoint 144 is connected to the communication network 112 through an analog or digital channel supported by the communications server 104.

Figure 3:
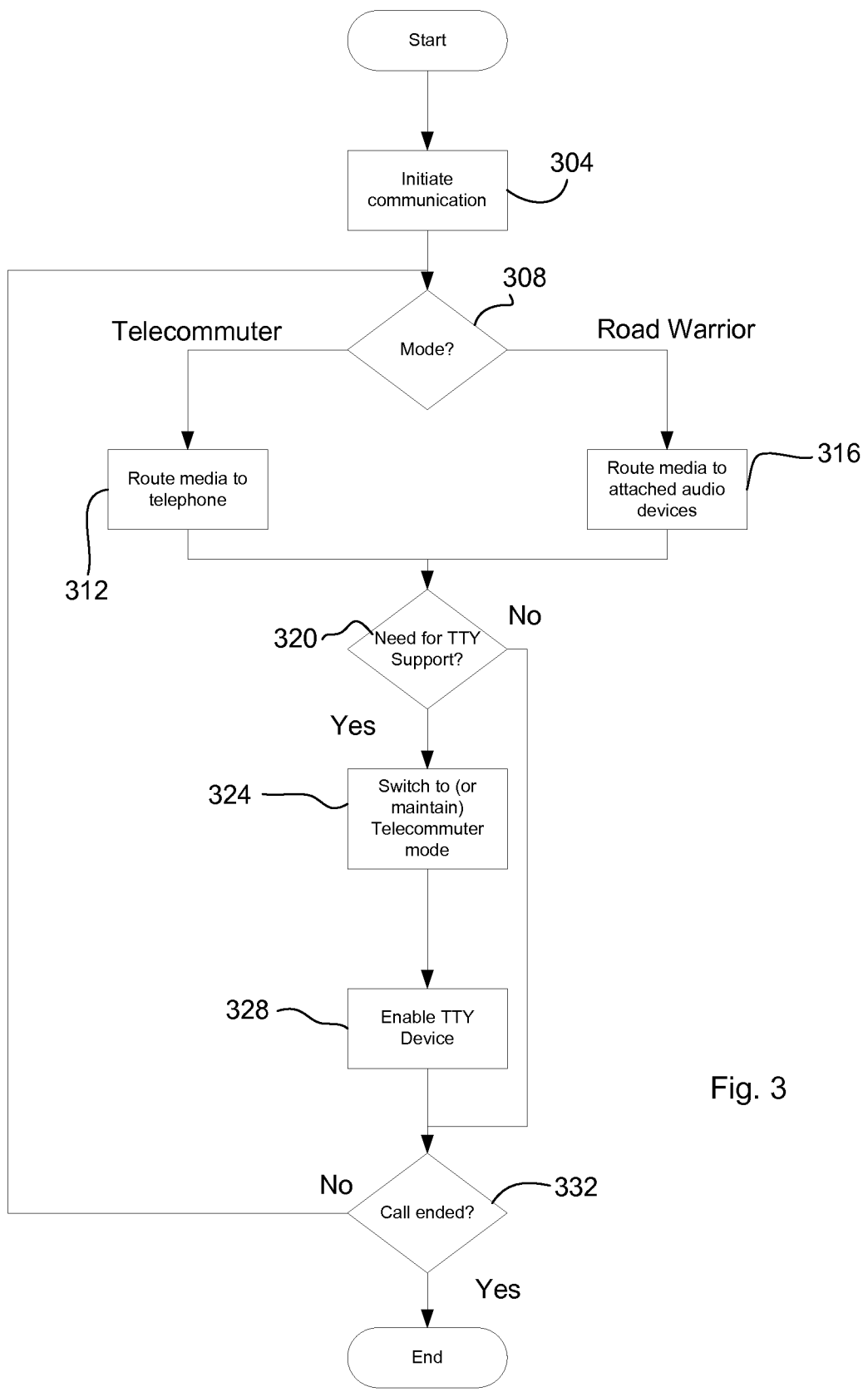
FIG. 3 is a flowchart depicting aspects of a method in accordance with embodiments of the present disclosure.

FIG. 3 is a flowchart depicting aspects of a method in accordance with embodiments of the present disclosure. Moreover, the method can be performed in connection with the operation of a soft client enabled communication device 140 or 144 incorporating a computer 128 as described herein.

At step 304, a communication is initiated. In general, the communication is, at least nominally, a voice telephony communication. However, as described herein, components of the system 100 can be configured to support pure TTY (i.e., text) or hybrid TTY (i.e., text and voice) communication using a voice telephony communication link. The initiated communication includes as an endpoint at least one communication device 108 that incorporates a computer 128 executing a soft client application 132 as described herein. As an example, but without limitation, the initiation of the communication can include a call from or to the communication endpoint 108 (e.g. an analog communication endpoint 136) of a customer or other user 116. Moreover, the communication can be received at or placed through a communications server 104. In such a scenario, the communication server 104 can select a soft client enabled communication endpoint 140 or 144 associated with an agent user 116 to handle the voice telephony communication. Where the communication includes a soft client enabled communication endpoint 144 using a WebRTC enabled browser 134 to support telephony communications, the communication endpoint 144 may be connected to a URL hosted by the server 104.

At step 308, a determination can be made as to the operating mode of the soft client enabled communication device 140 or 144 incorporating a computer 128. This determination can be made by the soft client application 132 executed by the computer 128 of the soft client enabled communication device 140 or 144. If the soft client enabled communication device 140 or 144 is determined to be in a Telecommuter mode, the media comprising the communication is routed to a telephone 120 connected to or associated with the computer 128 (step 312). More particularly, for the first type of soft client enabled communication device 140, the media is routed to a telephone 120 connected to the computer 128. For the second type of soft client enabled communication device 144, the media is routed to a telephone 120 associated with the soft client enabled communication device 144. Accordingly, the user 116 of the communication device 108 incorporating a computer 128 can participate in the communication using the hardware telephone 120. Alternatively, if the soft client enabled communication device 108 140 or 144 is determined to be in a Road Warrior mode, the media comprising the communication is routed for handling by the microphone 228 included in the user input 212 and the speaker 232 included in the user output 216 of the computer 128 (step 316).

At step 320, a determination is made as to whether a TTY support is required. The determination as to whether a TTY support is required can be made in various ways. For example, a user 116 of the soft client enabled communication endpoint 140, 144 can provide manual input indicating that the user has heard a TTY communication as part of the audible output provided to the user through the telephone 120 (when the soft client enabled communication device 140 or 144 is operating in Telecommuter mode), or through the speaker 232 of the user output 216 (when the soft client enabled communication device 140 or 144 is operating in Road Warrior mode). As another example, the presence of a TTY communication in the communication can be detected automatically by the monitor/branching application or function 220. For instance, a monitor/branching application or function 220 executed by the soft client enabled communication device 140 or 144 operating as an endpoint to the communication can perform the TTY communication detection function. As a further example, a monitor/branching application or function 220 executed by the communications server 104 can perform the TTY communication detection function.

The switch from a Road Warrior mode to a Telecommuter mode, and/or to one of the hybrid modes, can be made automatically or in response to user input. Factors that could identify the need for a mode change include:

(a) Receiving a call at the first communication endpoint, with a "Caller ID" number or name that is known to be associated with a TTY, HCO, or VCO requirement;
(b) Initiating a call from the first communication endpoint, to a number or name that is known to be associated with a TTY, HCO, or VCO requirement;
(c) Receiving a call at the first communication endpoint via an inbound phone number identified as being for TTY, VCO, HCO users;
(d) Receiving a call at the first communication endpoint that had been routed to the user via a TTY hunt group;
(e) Receiving a call at the first communication endpoint in which the calling party had previously self-identified as requiring TTY, VCO, HCO support;
(f) Detection of TTY communications by an enterprise public switched telephone network (PSTN) Gateway;
(g) Detection of TTY communications by the soft client.

In addition, the ability to switch modes manually is supported. For example, if the user of the communication endpoint operating in Road Warrior mode hears TTY communications in his or her headset, the user can switch manually to one of the TTY modes. The mode switching operations can be made mid-call.

In response to identifying the need for TTY communication, the soft client application 132 operating mode is switched to (or maintained in) the Telecommuter mode (step 324). By switching to (or maintaining) the Telecommuter mode, support for TTY communications at the soft client enabled communication endpoint 140 or 144 can be provided by the attached TTY device 124. Accordingly, embodiments of the present disclosure provide a soft client application 132 that is capable of switching from the Road Warrior mode to the Telecommuter mode mid call. In particular, connectivity with respect to the communication is maintained. In accordance with a soft client enabled communication device 144, switching to Telecommuter mode involves the server 104 routing the call to the telephone 120, either directly or by branching the call to a separate voice telephony (e.g., a PSTN) server.

At step 328, the TTY device 124 connected to the computer 128 of the soft client enabled communication endpoint 140 or 144 is enabled. Enabling the TTY device 124 can include branching the communication to that device 124. For example, a monitor/branching application 220 executed by the soft client enabled communication endpoint 140 or 144 can branch the media stream to the TTY device 124. Moreover, for the first type of soft client enabled communication endpoint 140, the monitor/branching application 220 can enable the connected telephone 120 as part of switching from the Road Warrior mode to the Telecommuter mode. As another example, a monitor/branching application 220 executed by the communications server 104 can operate in association with the second type of soft client enabled communication device 144 to signal that device 144 to enable the TTY device 124, and can branch the communication to the telephone 120 associated with the communication device 144. As yet another example, a monitor/branching application 220 executed by the server 104 can operate in connection with the second type of soft client enabled communication device 144 to send a signal to the TTY device 124 directly or through an additional server (e.g., a PSTN server). Accordingly, embodiments of the present disclosure allow a soft client enabled communication endpoint 140 or 144 to be configured to support TTY communications in response to detecting a TTY communication, even if doing so requires changing from a Road Warrior mode to a Telecommuter mode. In addition, the features provided by the soft client application 132 remain available to the user 116 of the soft client enabled communication endpoint 140 or 144.

At step 332, a determination can be made as to whether the call comprising the communication has ended. If the call has not ended, the process can return to step 308. Accordingly, embodiments of the present disclosure allow the operating mode of the soft client enabled communication endpoint 140 or 144 to be changed at any point in a call. In addition, monitoring for TTY communications can be performed for the duration of the call. If the call has terminated, the process can end.

Figure 4:
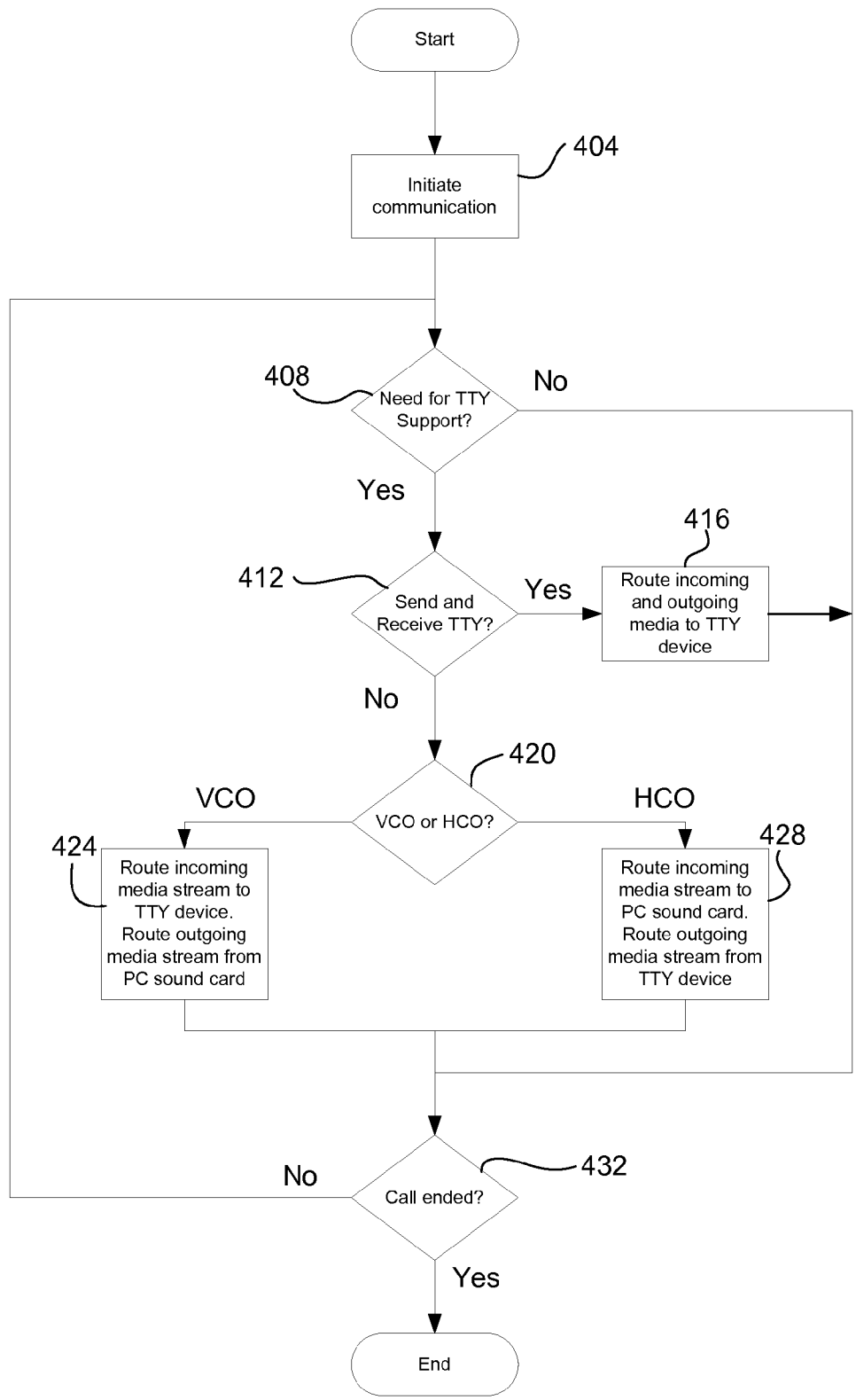
FIG. 4 is a flowchart depicting other aspects of a method in accordance with embodiments of the present disclosure.

With reference now to FIG. 4, aspects of a process for providing support for hybrid communications through a soft client enabled communication device 140 or 144 are illustrated. At step 404, a voice communication (e.g. a call) is initiated. The communication can be initiated from any communication endpoint 108 in the communication system 100, or by a communications server 104. In addition, at least one endpoint to the communication includes a soft client enabled communication endpoint 140 or 144.

At step 408, a determination is made as to whether TTY support is required and if hybrid TTY support is also required. For example, a user 116 of the soft client enabled communication endpoint 140 or 144 can provide manual input indicating that the user has heard a TTY communication as part of the audible output provided to the user through the telephone 120 (when the communication device 140 or 144 is operating in a Telecommuter mode), or through the speaker 232 of the user output 216 (when the communication device 140 or 144 is operating in Road Warrior mode). As another example, the presence of a TTY communication in the communication can be detected by a monitor/branching application or function 220. For instance, a monitor/branching application or function 220 executed by the soft client enabled communication device 140 or 144 operating at an endpoint to the communication can perform the TTY communication detection function. As a further example, a monitor/branching application or function 220 executed by the communication server 104 can perform the TTY communication detection function. Automatic detection can be put performed in various ways. For example, various factors can be used to automatically detect the presence of a TTY communication. These factors can include: a) Receiving a call at the first communication endpoint, with a "Caller ID" number or name that is known to be associated with a HCO, or VCO requirement; b) initiating a call from the first communication endpoint, to a number or name that is known to be associated with a HCO, or VCO requirement; and c) receiving a call at the first communication endpoint in which the calling party had previously self-identified as requiring HCO or VCO support. In addition, the ability to switch modes manually is supported. For example, if the user of the communication endpoint operating in Road Warrior mode hears TTY communications in his or her headset, the user can switch manually to one of the TTY modes. The mode switching operations can be made mid-call.

In response to determining the need for supporting a TTY communication, a determination is next made as to whether the entire communication (i.e. both incoming and outgoing media streams) comprises TTY communications (step 412). If the entire communication is determined to comprise TTY communications, the incoming and outgoing media streams are routed through the TTY device 124 connected to the soft client enabled communication endpoint 140 or 144 (step 416). This routing can be performed by a monitor/branching application 220 running on a server 104 or endpoint 140 or 144. In the case of a communication endpoint 144 running a WebRTC enabled browser 134, the routing can be performed by the server 104. Where TTY communication detection is performed automatically by a monitor/branching application or function 220, whether executed by the soft client enabled communication endpoint 140 or 144 or the communication server 104, that application or function 220 can signal a soft client application 132 to route the media to the TTY device 124. In the case of a communication endpoint 144 using either a thick client or a WebRTC enabled browser 134, the media is routed to the TTY device 124 by the server 104. Accordingly, all incoming and all outgoing signals are passed through the TTY device 124. In addition, the soft client application 132 or WebRTC enabled browser 134 remains operable, and the functions of the soft client application 132 with respect to the communication remain available to the user 116 of the soft client enabled communication endpoint 140 or 144.

Alternatively, if the communication is not entirely comprised of a TTY communication, a determination is next made as to whether the TTY communication is being used in a voice carryover (VCO) or a hearing carryover (HCO) communication style (step 420). As used herein, the style of the TTY communication is determined with reference to the remote user 116 (i.e. the user 116 that is remote with respect to the soft client enabled communication endpoint 140 or 144).

If the TTY communication is determined to be a VCO style communication, the incoming media stream is routed to the TTY device 124 connected to the computer 128 (step 424). The microphone 228 remains active, and can provide an outgoing media stream in the form of speech (i.e., a voice signal) provided by the user 116 of the soft client enabled communication device 140 or 144. Accordingly, the user 116 of the soft client enabled communication device 140 or 144 can receive the incoming media stream in the form of text through the TTY device 124. In addition to routing the incoming media stream to the TTY device 124, the soft client application 132 can disable the output of an audible portion of the call to the user 116 of the soft client enabled communication device 140 or 144. For example, the speaker 232 can be disabled by disabling the output from the soundcard of the computer 128. As a result, the user 116 is not provided with the audible tones comprising the incoming TTY communication. This provides an improved user experience, as the TTY tones can be very distracting. If the TTY communication is determined to be an HCO style communication, the outgoing media stream is routed from the TTY device 124 connected to the computer 128 (step 428). The speaker 232 remains active and can continue to provide the incoming media stream (i.e., the incoming voice) to the user 116 of the soft client enabled communication endpoint 140 or 144. The user 116 of the communication device 108 including the computer can therefore provide an outgoing media stream in the form of text input by the user through the TTY device 124. In addition to sending an outgoing media steam from the TTY device 124, the soft client application 132 can disable the microphone 228. Accordingly, room or other noise that might be picked up by the microphone 228 and that could interfere with the accurate transmission of the TTY communications is prevented from entering the media stream. At step 432, a determination can be made as to whether the call has ended. If the call has not ended, the process can return to step 408. Accordingly, monitoring for the presence of a TTY communication can be performed continuously, for the entire duration of the call. If the call is concluded, the process can end.

As described herein, systems and methods that provide support for the use of a TTY device 124 in combination with a soft client enabled communication endpoint 140 or 144 are provided. The soft client communication endpoint 140 or 144 can provide a voice telephony facility in connection with a thick client soft phone application 132, a thin client soft phone application 132 that is hosted by a virtual machine service, or a thin client in the form of a WebRTC enabled browser application 134 that provides support for voice telephony.

Although specific example scenarios have been discussed, other embodiments and configurations are possible. For example, multiple endpoints to a call can utilize soft client enabled communication endpoints 140 or 144 with support for mode switching and/or hybrid communication modes as described herein. In addition, although examples have been discussed in which a soft client enabled communication endpoint 140 or 144 is provided as part of a call center or other enterprise system or network, inclusion in such a system or network is not required. In addition, it should be appreciated that the participation of a communication server in the detection of modes and or the branching of media streams between output devices is not required. Rather at least some embodiments of the present disclosure can be implemented by a soft client enabled communication endpoint 140 executing a monitor/branching application or function 220 as described herein.

In accordance with still other embodiments, there is a direct communication path between a communication server 104, such as a PBX and a TTY device 124. In this configuration, control of the media streams, and in particular control of whether the PC 128 audio mechanism of the soft client enabled communication endpoint 144 or the TTY device 124 associated with the soft client enabled communication endpoint 144 should be the media endpoint, is handled by the communication server 104. For example, through the execution of a monitor/branching application 220 by the communication server 104, the media streams can be controlled.

In accordance with embodiments of the present invention, incorporating a communication endpoint 144 using a WebRTC enabled browser 134, telephony communications are carried by the Internet by connecting the browser 134 to a URL hosted by the server 104. In order to provide an analog signal to a TTY device 124 associated with the communication endpoint 144, the server 104 can branch the communication to another server, such as a PBX or PSTN server, that is capable of transporting a TTY communication to and from the TTY device 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A communication method, comprising:
   initiating a first telephony communication at a first communication endpoint associated with a first user, wherein the first communication endpoint includes a computer that provides a first voice telephony function through a soft client;

determining a need to support a TTY communication as part of the first telephony communication;

in response to determining a need to support a TTY communication, enabling a first TTY device, wherein the computer maintains control of features of the first telephony communication; and determining that the first telephony communication has not ended and continuing to determine the need to support the TTY communication as part of the first telephony communication.

2. The method of claim 1, wherein the TTY communication includes text that is provided as input to the first TTY device by the first user and text that is output to the first user by the first TTY device, wherein all communications to and from the first user of the first communication endpoint is through the first TTY device.

3. The method of claim 2, wherein the transmit and receive voice telephony functions of the soft client are muted temporarily while the TTY device is in use.

4. The method of claim 1, wherein the first telephony communication transmitted by the first user is provided as input to the TTY device and the first telephony communication received by the first user is provided through the voice telephony function of the soft client.

5. The method of claim 1, wherein the first telephony communication received by the first user is provided by the TTY device and the first telephony communication transmitted by the first user is provided through the voice telephony function of the soft client.

6. The method of claim 5, further comprising determining that the first telephony communication is being used in a hearing carryover (HCO) communication style.

7. The method of claim 1, wherein the first TTY device is a peripheral device interconnected to but separate from the computer.

8. The method of claim 1, wherein the first TTY device is connected to the communication server.

9. The method of claim 1, wherein determining the need to support the TTY communication includes the first user of the first communication endpoint hearing TTY communications, the method further comprising:

the first user of the first communication endpoint providing input to the computer to cause the computer to direct the TTY communication to the first TTY device, wherein in response to receiving the TTY communication the first TTY device provides a text output to the first user.

10. The method of claim 1, wherein determining the need to support the TTY communication includes determining at least one of: a caller ID associated with a TTY user; a caller using a designated TTY communication address; a caller routed by a TTY hunt group; and detecting the TTY communication at a gateway device.

11. The method of claim 1, wherein the step of determining the need to support the TTY communication comprises identifying the existence of one or more conditions from the group consisting of:

(a) receiving a call at the first communication endpoint, with a "Caller ID" number or name that is known to be associated with a TTY, HCO, or VCO requirement;

(b) initiating a call from the first communication endpoint, to a number or name that is known to be associated with a TTY, HCO, or VCO requirement;

(c) receiving a call at the first communication endpoint via an inbound phone number identified as being for TTY, HCO, or VCO users;

(d) receiving a call at the first communication endpoint that had been routed to the user via a hunt group;

(e) receiving a call at the first communication endpoint in which the calling party had previously self-identified as requiring TTY, HCO, or VCO support;

(f) detection of TTY communications by an enterprise public switched telephone network (PSTN) Gateway;

(g) detection of TTY communications by the soft client.

12. The method of claim 1, further comprising switching an operating mode of the soft client after the determining the need to support the TTY communication as part of the first telephony communication, wherein the operating mode comprises one of a telecommuter mode, a road warrior mode, and a hybrid mode.

13. The method of claim 12, wherein the operating mode is switched by a user manually.

14. A communication system, comprising:
a computer, including:
a user output, wherein the user output includes at least one of a speaker and a headset;
a user input, wherein the user input includes a microphone;
memory;
a processor;
application programming stored in the memory and executed by the processor, the application programming including a soft client application that provides a plurality of non-media and call control functions;
a TTY device, wherein the TTY device is associated with the computer, wherein a TTY communication portion of a telephony communication is routed through the TTY device, while the computer continues to provide the plurality of non-media and call control functions;
a communication interface provided by the computer and connected to a communication network, wherein the telephony communication is passed over the communication network, wherein the TTY communication portion of the telephony communication is passed through the communication interface; and
a sound card provided by the computer, wherein the at least one of the user output and the user input are connected to the sound card, wherein, in response to identifying the need for a TTY communication, a first one of the user output and the user input is enabled, and wherein a second one of the user output and the user input is disabled, wherein
in response to determining that the telephony communication has not ended, the computer continues to identify the need for the TTY communication.

15. The system of claim 14, further comprising:
a peripheral interface, wherein the TTY device is interconnected to the computer by the peripheral interface.

16. The system of claim 15, wherein the peripheral interface includes at least one of a universal serial bus port and an audio output.

17. The system of claim 14, further comprising:
a server, wherein the TTY communication portion of the telephony communication is routed to the TTY device by the server.

18. A tangible non-transitory computer readable medium having stored thereon computer executable instructions, the computer executable instructions causing a processor to execute a method for controlling telephony functions, the computer executable instructions comprising:

instructions to receive a signal indicating that a TTY communication has been detected as part of a telephony communication;

in response to the signal indicating that a TTY communication has been detected, instructions to at least one of direct the TTY communication to a TTY device and receive the TTY communication from a TTY device;

instructions to provide a plurality of telephony functions, wherein said plurality of telephony functions are available in the presence of a TTY communication; and instructions to determine that the telephony communication has not ended and continue to determine the need to support the TTY communication as part of the telephony communication.

19. The tangible non-transitory computer readable medium of claim 18, further comprising:

instructions to disable one of a user input and a user output while directing the TTY communication to or receiving the TTY communication from a TTY device.

20. The tangible non-transitory computer readable medium of claim 18, wherein the TTY communication is passed through a computer that executes the computer executable instructions.

\* \* \* \* \*

UNITED STATES PATENT AND TRADEMARK OFFICE
CERTIFICATE OF CORRECTION

| | |
|---|---|
| PATENT NO. | : 8,917,820 B2 |
| APPLICATION NO. | : 13/777531 |
| DATED | : December 23, 2014 |
| INVENTOR(S) | : Paul Roller Michaelis |

It is certified that error appears in the above-identified patent and that said Letters Patent is hereby corrected as shown below:

In the Claims

At column 13, line 21, claim 3, please delete "the" from the phrase --wherein the transmit and receive--.

Signed and Sealed this
Fourth Day of August, 2015

Michelle K. Lee
*Director of the United States Patent and Trademark Office*